(12) United States Patent
Bovington et al.

(10) Patent No.: US 12,717,083 B2
(45) Date of Patent: Aug. 25, 2026

(54) SINGLE POLARIZATION CIRCULATOR

(71) Applicant: Cisco Technology, Inc., San Jose, CA (US)

(72) Inventors: Jock T. Bovington, Koenigstein Im Taunus (DE); Mark C. Nowell, Ottawa (CA); Matthew J. Traverso, Saratoga, CA (US); Long Chen, Marlboro, NJ (US)

(73) Assignee: Cisco Technology, Inc., San Jose, CA (US)

( * ) Notice: Subject to any disclaimer, the term of this patent is extended or adjusted under 35 U.S.C. 154(b) by 728 days.

(21) Appl. No.: 18/177,552

(22) Filed: Mar. 2, 2023

(65) Prior Publication Data

US 2024/0295694 A1 Sep. 5, 2024

(51) Int. Cl.
*G02B 6/126* (2006.01)
*G02B 6/27* (2006.01)
*H04B 10/61* (2013.01)

(52) U.S. Cl.
CPC .......... *G02B 6/126* (2013.01); *G02B 6/2766* (2013.01); *G02B 6/2773* (2013.01); *H04B 10/614* (2013.01)

(58) Field of Classification Search
CPC .... G02B 6/126; G02B 6/2773; H04B 10/614; H04B 10/532
See application file for complete search history.

(56) References Cited

U.S. PATENT DOCUMENTS 9,207,461 B2 * 12/2015 Frankel ................ G02B 27/286
11,990,941 B2 * 5/2024 Razzell ................ H04B 10/614
2005/0134960 A1 6/2005 Fujita et al.
2012/0128350 A1 5/2012 Popovic
2014/0334764 A1 11/2014 Galland et al.
(Continued)

FOREIGN PATENT DOCUMENTS

CN 103149639 A 6/2013
KR 20150055389 A 5/2015
WO WO-2018167720 A1 * 9/2018 .......... G02B 6/2746

OTHER PUBLICATIONS

Leon Poutievski et al., "Jupiter Evolving: Transforming Google's Datacenter Network via Optical Circuit Switches and Software-Defined Networking," SIGCOMM'22, Dated: Aug. 22-26, 2022, pp. 1-20.

(Continued)

*Primary Examiner* — Eric Wong
(74) *Attorney, Agent, or Firm* — Patterson + Sheridan, LLP

(57) ABSTRACT

A system, method, and photonic chip for an optical circulator are described. The system includes a first polarization splitter, a first optical circuit, and a first controller. The first polarization splitter receives, at a first port of the first polarization splitter, a first optical signal. The first optical circuit is optically coupled to the first polarization splitter. The first optical circuit includes a first plurality of phase shifters. The first optical circuit receives, at a first port of the first optical circuit, a second optical signal. The first controller adjusts the first plurality of phase shifters such that the first optical circuit outputs the first optical signal at a second port of the first optical circuit and such that the first polarization splitter outputs the second optical signal at the first port of the first polarization splitter.

20 Claims, 4 Drawing Sheets

(56) References Cited

U.S. PATENT DOCUMENTS

2018/0234348 A1* 8/2018 Goloubew .............. H04L 43/04

OTHER PUBLICATIONS

Urata, Ryohei, et al. "Mission Apollo: Landing optical circuit switching at datacenter scale." arXiv preprint arXiv:2208.10041, Dated: Aug. 22, 2022, pp. 1-13.
A. Nespola et al., "Proof of Concept of Polarization-Multiplexed PAM Using a Compact Si-Ph Device," in IEEE Photonics Technology Letters, vol. 31, No. 1, pp. 62-65, 1 Jan. 1, 2019, doi: 10.1109/LPT.2018.2882888. [Abstract Only].
P. Liao et al., "A 260 GB/s/? PDM Link with Silicon Photonic Dual-Polarization Transmitter and Polarization Demultiplexer," 2021 European Conference on Optical Communication (ECOC), Bordeaux, France, 2021, pp. 1-4, doi: 10.1109/ECOC52684.2021.9606144. [Abstract Only].
Z. Lin et al., "High-performance and Ultra-compact Endless Automatic Polarization Controller based on Thin-film Lithium Niobate," 2022 Optical Fiber Communications Conference and Exhibition (OFC), San Diego, CA, USA, 2022, pp. 1-3. [Abstract Only].
Chris Doerr et al., "Proposal for 800G-LR4 Optical PMD Based on DP-PAM4," IEEE802.3df, pp. 1-23.
Hsu-Hao Chang, "Integrated Hybrid Silicon Triplexer," University of California, Dated: Dec. 2020, pp. 1-24.
Duanni Huang et al., "Dynamically Reconfigurable Integrated Optical Circulators," Optica, Dated: Dec. 21, 2016, pp. 1-8.
Yang Jing Wen et al., "200G self-homodyne detection with 64QAM by endless optical polarization demultiplexing," Optics Express, dated: Jul. 9, 2020, pp. 1-16.
Yisu Yang et al., "Experimental demostration of broadband Lorentz non-reciprocity in an integrable photonic architecture based Mach-Zehnder modulators," Optics Express, Dated: Jul. 14, 2014, pp. 1-14.
Hsu-Hao Chang et al., "Integrated Hybrid Silicon Triplexer," Optical Society of America, Year: 2010, pp. 1-3.

* cited by examiner

100
Circulator
102
Controller
110
Optical Signal
132
134
128
130
120
118
116
114
112
108
Optical Circuit
PSR
106
122
124
126
Fiber
104

SINGLE POLARIZATION CIRCULATOR

TECHNICAL FIELD

Embodiments presented in this disclosure generally relate to optical communications. More specifically, embodiments disclosed herein relate to an optical circulator.

BACKGROUND

Fiber plant limitations or fiber limitations may limit usable capacity in an optical network. An existing technique for addressing this limit on usable capacity is to use bidirectional optical modules that communicate on fibers in both directions (e.g., transmissions and receiving).

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

Figure 1:
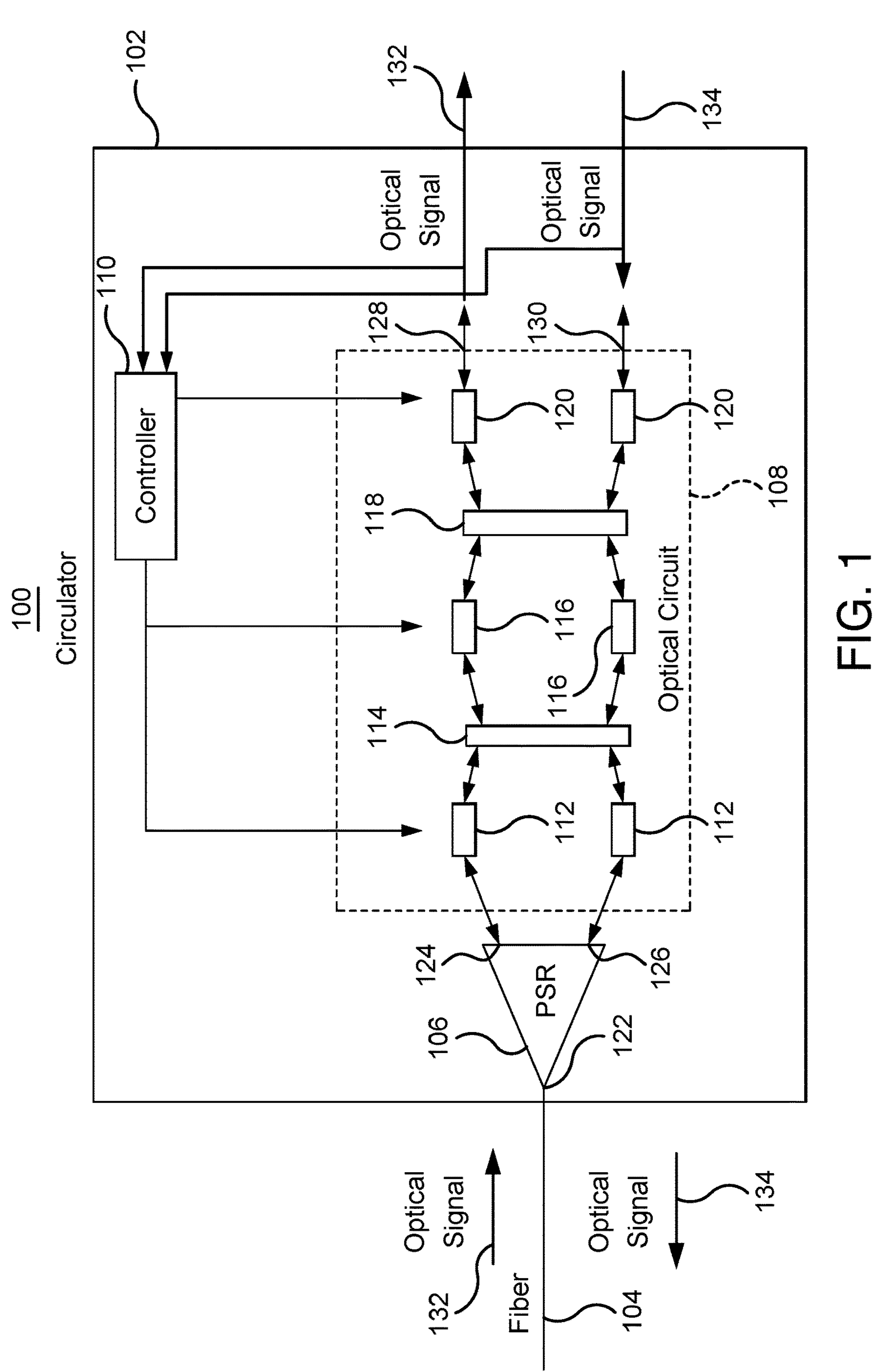
FIG. 1 illustrates an example system that includes an optical circulator.

According to an embodiment, a system includes a first polarization splitter, a first optical circuit, and a first controller. The first polarization splitter receives, at a first port of the first polarization splitter, a first optical signal. The first optical circuit is optically coupled to the first polarization splitter. The first optical circuit includes a first plurality of phase shifters. The first optical circuit receives, at a first port of the first optical circuit, a second optical signal. The first controller adjusts the first plurality of phase shifters such that the first optical circuit outputs the first optical signal at a second port of the first optical circuit and such that the first polarization splitter outputs the second optical signal at the first port of the first polarization splitter.

According to another embodiment, a method includes receiving, at a first port of a first polarization splitter, a first optical signal and receiving, at a first port of a first optical circuit optically coupled to the first polarization splitter, a second optical signal. The first optical circuit includes a first plurality of phase shifters. The method also includes adjusting by a first controller, the first plurality of phase shifters such that the first optical circuit outputs the first optical signal at a second port of the first optical circuit and such that the first polarization splitter outputs the second optical signal at the first port of the first polarization splitter.

According to another embodiment, a photonic chip includes a polarization splitter that receives a first optical signal at a first port of the polarization splitter, a first multiplexer that receives a first output from the polarization splitter, a second multiplexer that receives a second output from the polarization splitter, and a first optical circuit optically coupled to the first multiplexer and the second multiplexer. The optical circuit includes a plurality of phase shifters arranged (i) such that the first optical circuit outputs, at a first port of the optical circuit, the first optical signal and (ii) such that the polarization splitter outputs, at the first port of the polarization splitter, a second optical signal received at a second port of the first optical circuit.

Example Embodiments

Bidirectional optical circuits that communicate on fibers in both directions (e.g., transmission and receiving) may be used to increase the usable capacity of a network (e.g., by increasing the number of available channels on which to transmit). Existing bidirectional optical circuits may use an external device (e.g., wavelength selective filter/multiplexers and circulators) to manage bidirectionality, but these techniques may not be easily integrated into silicon photonics. For example, existing optical circulators may use non-reciprocal optics, which means that changes in the properties of light passing through the device are not reversed when the light passes through in the opposite direction.

The present disclosure describes a polarization tracker circuit that is used as a circulator. Generally, the polarization tracker includes a polarization splitter (which may be a polarization splitter rotator (PSR) or a polarization splitter grating coupler), an optical circuit optically coupled to the polarization splitter, and a controller. For clarity, the examples described herein will include a PSR, but it is understood that the examples may instead include a polarization splitter grating coupler. The PSR receives a first optical signal at a first port of the PSR. The controller may adjust phase shifters in the optical circuit such that the optical circuit outputs the first optical signal at a first port of the optical circuit. The optical circuit may also receive a second optical signal at a second port of the optical circuit. The controller may adjust the phase shifters to cause the PSR to output the second optical signal at the first port of the PSR, where the first optical signal was received by the PSR. The polarization tracker circuit may be more easily integrated into silicon photonics than existing circulators. Thus, the polarization tracker circuit may allow a bidirectional optical circuit to be implemented in silicon photonics.

FIG. 1 illustrates an example system 100. As seen in FIG. 1, the system 100 includes a circulator 102 and a fiber 104. Generally, the circulator 102 implemented using a polarization tracker, and the circulator may be integrated in a silicon photonic chip. In particular embodiments, the circulator 102 provides bidirectional optical communication over the fiber 104.

The circulator 102 may operate as a polarization dependent circulator or a polarization induced circulator. As seen in FIG. 1, the circulator 102 includes a polarization splitter (e.g., a PSR 106), an optical circuit 108, and a controller 110. The optical circuit 108 is optically coupled to the PSR 106. The controller 110 adjusts or controls the optical circuit 108. In existing circuits, the PSR 106, optical circuit 108, and controller 110 may operate as a polarization tracker. In the example of FIG. 1, the PSR 106, optical circuit 108, and controller 110 operate as an optical circulator.

The PSR 106 may include a polarizing beam splitter and a polarization rotator. Generally, the PSR 106 separates two orthogonal polarization states in an optical signal and then rotates one of the polarization states by 90 degrees. For example, the PSR 106 may separate the transverse electric and transverse magnetic components of the optical signal. The PSR 106 may then rotate the transverse magnetic component 90 degrees so that the rotated transverse magnetic component is aligned with the transverse electric component. The PSR 106 may then output the transverse electric component and the rotated transverse magnetic component to the optical circuit 108. The PSR 106 may also perform the same operation in reverse to produce an optical signal. For example, the PSR 106 may receive two polarization states of an optical signal from the optical circuit 108. The PSR 106 may rotate one of the polarization states and then combine the polarization state with the rotated polarization state into an optical signal. The PSR 106 may then output that optical signal over the fiber 104.

The optical circuit 108 is optically coupled to the PSR 106. As seen in FIG. 1, the optical circuit 108 includes phase shifters 112, an optical coupler 114, phase shifters 116, an optical coupler 118 and phase shifters 120. The optical coupler 114 optically couples the phase shifters 112 and the phase shifters 116. The optical coupler 118 optically couples the phase shifters 116 and the phase shifters 120. The optical circuit 108 may include any suitable number of sets of phase shifters coupled by any suitable number of optical couplers. Generally, the optical circuit 108 may receive the separated and rotated polarization states from the PSR 106. For example, if the PSR 106 separates the transverse electric and transverse magnetic components of an optical signal, then the optical circuit 108 may receive the transverse electric component of the optical signal and the rotated transverse magnetic component of the optical signal from the PSR 106. The phase shifters 112, 116, and 120 may adjust the phase of the transverse electric and rotated transverse magnetic components from the PSR 106.

The controller 110 may adjust the phase shifters 112, 116, and 120 in the optical circuit 108 to produce a desired output from the optical circuit 108. In particular embodiments, the controller 110 adjusts the phase shifters 112, 116, and 120 in the optical circuit 108 so that the optical circuit 108 outputs the optical signal 132 that was received at the PSR 106 over the fiber 104. The controller 110 may include a processor and a memory that perform the functions and actions of the controller 110.

The processor is any electronic circuitry, including, but not limited to one or a combination of microprocessors, microcontrollers, application specific integrated circuits (ASIC), application specific instruction set processor (ASIP), and/or state machines, that communicatively couples to the memory and controls the operation of the controller 110. The processor may be 8-bit, 16-bit, 32-bit, 64-bit or of any other suitable architecture. The processor may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The processor may include other hardware that operates software to control and process information. The processor executes software stored on the memory to perform any of the functions described herein. The processor controls the operation and administration of the controller 110 by processing information (e.g., information received from the phase shifters 112, 116, and 120 and the memory). The processor is not limited to a single processing device and may encompass multiple processing devices.

The memory may store, either permanently or temporarily, data, operational software, or other information for the processor. The memory may include any one or a combination of volatile or non-volatile local or remote devices suitable for storing information. For example, the memory may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in the memory, a disk, a CD, or a flash drive. In particular embodiments, the software may include an application executable by the processor to perform one or more of the functions described herein.

As an example operation, the PSR 106 may receive an optical signal 132 over the fiber 104 at a port 122 of the PSR 106. The PSR 106 separates the transverse electric and transverse magnetic components of the optical signal 132 and rotates the transverse magnetic component by 90 degrees. The PSR 106 outputs the transverse electric component of the optical signal 132 at a port 124 of the PSR 106. The PSR 106 outputs the rotated transverse magnetic component of the optical signal 132 at a port 126 of the PSR 106.

The controller 110 adjusts the phase shifters 112, 116, and 120 so that the optical circuit 108 outputs the optical signal 132 at a port 128 of the optical circuit 108. In some embodiments, there is an optical tap and/or a photodiode at a port 130 of the optical circuit 108. The controller 110 may determine whether any of the optical signal 132 is present at the port 130 using the optical tap or the photodiode. If any of the optical signal 132 is present at the port 130, the controller 110 may adjust the phase shifters 112, 116, and 120 to reduce or eliminate the optical signal 132 at the port 130, which directs the optical signal 132 to the port 128. In this manner, the controller 110 controls the optical circuit 108 so that the optical circuit 108 outputs the optical signal 132 at the port 128. In certain embodiments, another fiber may be optically coupled to the port 128 to carry the optical signal 132 away from the circulator 102.

The optical circuit 108 may receive an optical signal 134 at the port 130 of the optical circuit 108. The optical signal 134 at the port 130 may be of the same polarization as the optical signal 132 at the port 128. In some embodiments, an optical fiber is optically coupled to the port 130 to carry the optical signal 134 to the port 130. The controller 110 may monitor the optical signal 134 at the port 130. For example, the controller 110 may use the optical tap or the photodiode at the port 130 to monitor the optical signal 134. The controller 110 may adjust the phase shifters 112, 116, and 120 so that the optical circuit 108 outputs polarization states of the optical signal 134 to the PSR 106. For example, the controller 110 may adjust the phase shifters 112, 116, and 120 so that the optical circuit 108 outputs the transverse electric component of the optical signal 134 and the rotated transverse magnetic component of the optical signal 134 to the PSR 106. The PSR 106 may then rotate the rotated transverse magnetic component of the optical signal 134 and combine the resulting transverse magnetic component with the transverse electric component to produce the optical signal 134. The PSR 106 then outputs the optical signal 134 at the port 122 over the fiber 104. The optical signal 134 at the port 122 and the optical signal 132 at the port 122 may have orthogonal polarizations relative to each other (e.g., if the wavelengths of the optical signal 132 and the optical signal 134 are the same). The optical signal 134 at the port 122 and the optical signal 132 at the port 122 may have the same polarizations (e.g., if the wavelengths of the optical signal 132 and the optical signal 134 are different). The fiber 104 then carries the optical signal 134 away from the circulator 102.

In this manner, the controller 110 adjusts the phase shifters 112, 116, and 120 to implement an optical circulator function. Specifically, the controller 110 adjusts the phase shifters 112, 116, and 120 such that when the circulator 102 receives the optical signal 132 at the port 122, the optical circulator 102 outputs the optical signal 132 at the port 128. Additionally, when the circulator 102 receives the optical signal 134 at the port 130, the circulator 102 outputs the optical signal 134 at the port 122, where the optical signal 132 was received. In this manner, the circulator 102 provides for bidirectional communication over the fiber 104.

As seen in FIG. 1, the controller 110 may receive input from the optical signals 132 and 134 at the ports 128 and 130. For example, there may be photodetectors coupled to the ports 128 and 130 or the controller 110 may include photodetectors that convert the optical signals 132 and 134 into electric signals. The controller 110 then analyze these electric signals to determine how to adjust the phase shifters 112, 116, and 120 in the optical circuit 108.

In the present disclosure, it is considered that a component outputs a particular optical signal even if certain impairments have occurred to the optical signal. For example, even if the output of the port 128 of the optical circuit 108 is not identical to the optical signal 132 received at the port 122 of the PSR 106 due to certain impairments, it is still considered that the optical circuit 108 outputs the optical signal 132 at the port 128. The optical signal 132 output at the port 128 may have an amplitude that is attenuated relative to the amplitude of the optical signal 132 received at the port 122. The optical signal 132 output at the port 128 may include interference from cross-talk relative to the optical signal 132 received at the port 122. The optical signal 132 output at the port 128 may include a different polarization relative to the optical signal 132 received at the port 122. As another example, even if the output of the port 122 of the PSR 106 is not identical to the optical signal 134 received at the port 130 of the optical circuit 108 due to certain impairments, it is still considered that the PSR 106 outputs the optical signal 134 at the port 122. The optical signal 134 output at the port 122 may have an amplitude that is attenuated relative to the amplitude of the optical signal 134 received at the port 130. The optical signal 134 output at the port 122 may include interference from cross-talk relative to the optical signal 134 received at the port 130. The optical signal 134 output at the port 122 may include a different polarization relative to the optical signal 134 received at the port 130. Thus, when a particular component (e.g., the PSR 106 or the optical circuit 108) is described as outputting a particular optical signal received at another component (e.g., the optical circuit 108 or the PSR 106), it is understood that the output optical signal may include certain impairments (e.g., attenuated amplitude, interference from cross-talk, different polarizations, etc.) that are not included in the received optical signal.

Figure 2:
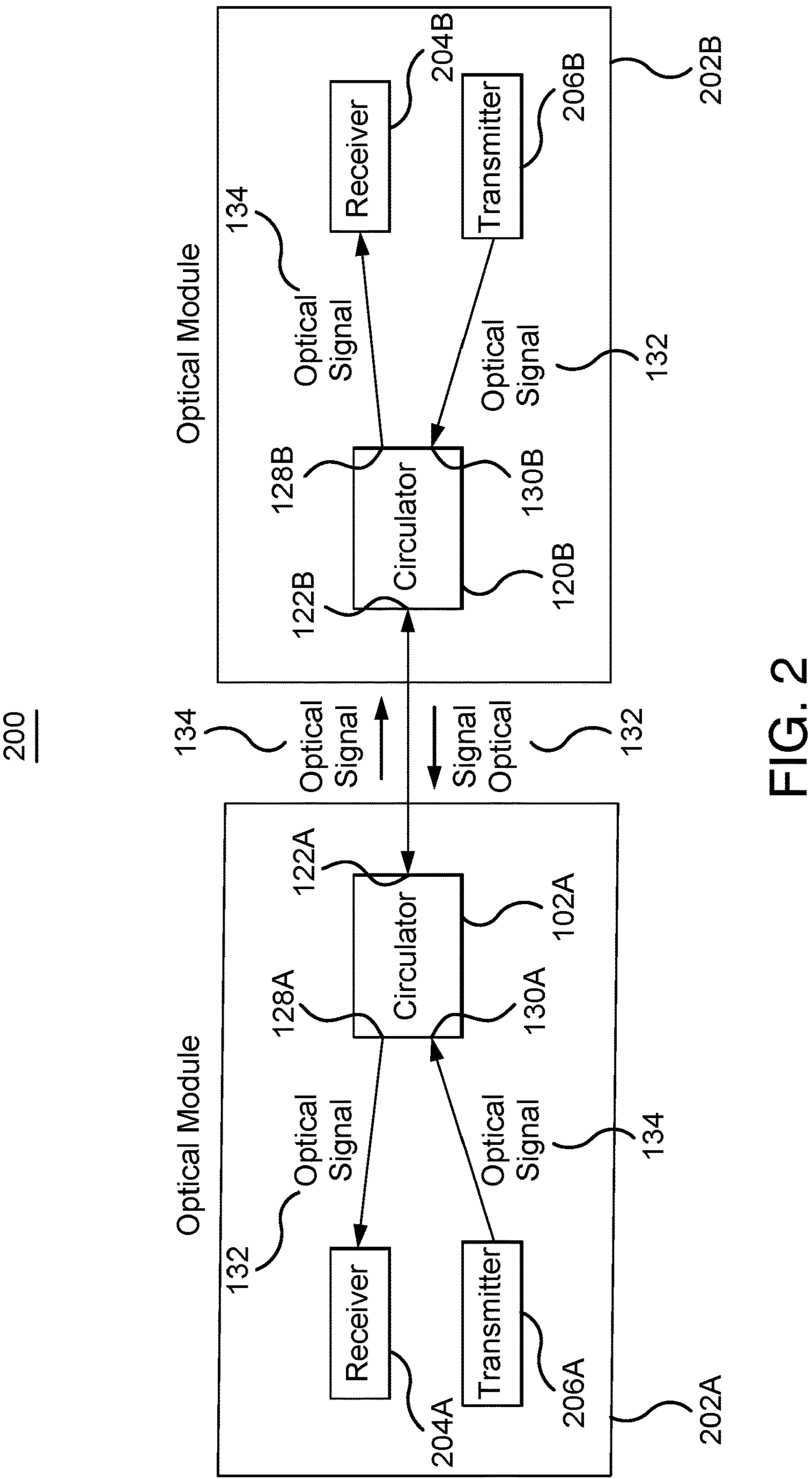
FIG. 2 illustrates an example system that includes the optical circulator of FIG. 1.

FIG. 2 illustrates an example system 200. As seen in FIG. 2, the system 200 includes an optical module 202A and an optical module 202B. Generally, the optical modules 202A and 202B use the optical circulator 102 of FIG. 1 to implement bidirectional communication integrated into a silicon photonics chip.

The optical module 202A includes an optical circulator 102A, an optical receiver 204A, and an optical transmitter 206A. The receiver 204A and the transmitter 206A are optically coupled to the optical circulator 102A. As see in FIG. 2, the receiver 204A is optically coupled to a port 128A of the circulator 102A. The transmitter 206A is optically coupled to a port 130A of the circulator 102A. The optical circulator 102A may include every component of the optical circulator 102 shown in FIG. 1. For example, the optical circulator 102A may include a polarization splitter (e.g., a PSR 106, an optical circuit 108, and a controller 110).

The optical module 202B includes a circulator 102B, an optical receiver 204B, and an optical transmitter 206B. The receiver 204B is optically coupled to the port 128B of the circulator 102B. The transmitter 206B is optically coupled to the port 130B of the circulator 102B. The optical circulator 102B may include every component of the optical circulator 102 shown in FIG. 1. For example, the optical circulator 102B may include a polarization splitter (e.g., a PSR 106, an optical circuit 108, and a controller 110).

The circulators 102A and 102B are connected by a fiber. For the PSRs 106 in the optical circulators 102A and 102B may be connected by the fiber. The fiber connects the port 122A of the PSR of the circulator 102A with the port 122B of the PSR of the circulator 102B. Thus, the optical modules 202A and 202B may include reciprocal circuits. Additionally, the circulators 102A and 102B provide for bidirectional communication over the fiber.

In an example operation, the transmitter 206A transmits the optical signal 134 to the port 130A of the circulator 102A. As discussed above, a controller of the circulator 102A controls the circulator 102A so that the circulator 102A outputs the optical signal 134 at the port 122A. The optical signal 134 travels to the circulator 102B over the fiber. A controller of the circulator 102B controls the circulator 102B so that the circulator 102B outputs the optical signal 134 at the port 128B of the circulator 102B. The optical signal 134 then travels to the receiver 204B.

The transmitter 206B transmits the optical signal 132 to the port 130B of the circulator 102B. The controller of the circulator 102B controls the circulator 102B so that the circulator 102B outputs the optical signal 132 at the port 122B of the circulator 102B. The optical signal 132 then travels over the fiber to the port 122A of the circulator 102A. The controller of the circulator 102A controls the circulator 102A such that the circulator 102A outputs the optical signal 132 at the port 128A of the circulator 102A. The optical signal 132 then travels to the receiver 204A. Thus, the circulators 102A and 102B allow the transmitter 206A to communicate with the receiver 204B and the transmitter 206B to communicate with the receiver 204A over a common fiber (which may be a single mode fiber).

Because the optical signals from the transmitters 206A and 206B may pass through the controllers of the optical modules 202A and 202B (e.g., through optical taps or photodiodes that monitor optical signals being received at the receivers 204A and 204B), the polarization state of the output of the transmitters 206A and 206B may fluctuate at the rate of the controllers in addition to any fluctuations in the fiber. As a result, if both sides of the fiber have such a matching controller, then there is a risk that the optical circulators 102A and 102B compete against each other to manage the polarization (which may be referred to as "chatter"). In some embodiments, different control loop bandwidth requirements may be set or assigned for the different optical modules 202A and 202B (e.g. $f_L$ and $f_R$), which prevents chatter or the tug of war of the two circulators 102A and 102B because each circulator 102A and 102B is correcting for changes in polarization at a different rate. Thus, as long as $f_L$ and $f_R$ are greater than the rate of change of polarization in the fiber, then the optical modules 202A and 202B may converge to a stable equilibrium. In addition to changing the rate of tuning of each side of the fiber, different step sizes for each controller (e.g., by making slight changes in the bias step or the length of the phase section) may be used so that the controllers do not oscillate in their steady state. Furthermore, the phase modulation in the polarization tracker may be either lower speed thermal tuning or higher speed using modulator approaches. The speed requirement may depend on the target polarization tracking speed requirements.

Figure 3:
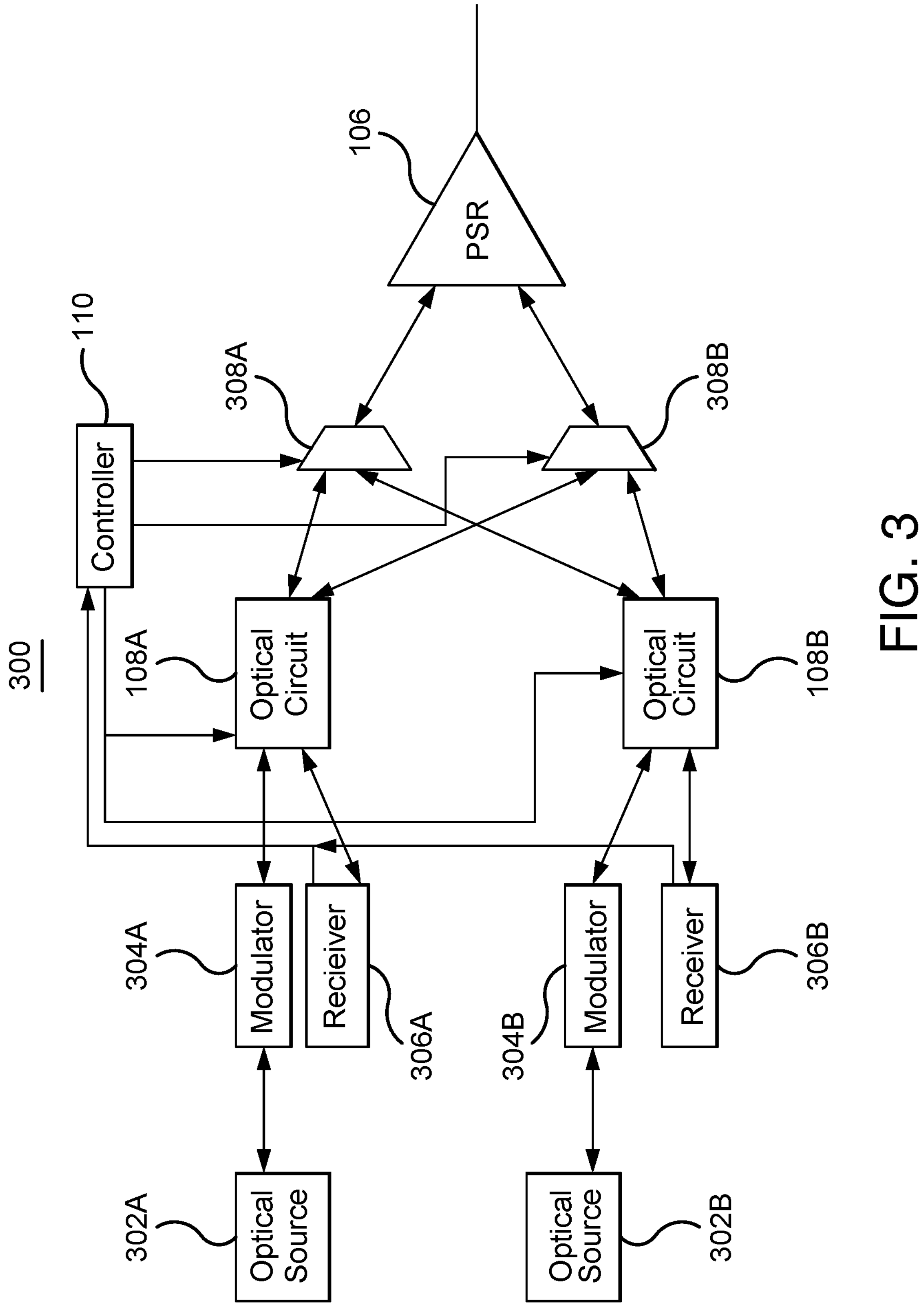
FIG. 3 illustrates an example system that includes the optical circulator of FIG. 1.

The optical circulator 102 may be expanded to accommodate additional optical signals of different wavelengths or colors. FIG. 3 illustrates an example system 300 that handles additional optical signals. As seen in FIG. 3, the system 300 includes optical sources 302A and 302B, modulators 304A and 304B, receivers 306A and 306B, optical circuits 108A and 108B, multiplexers/demultiplexers 308A and 308B, and the PSR 106. Generally, the multiplexers/demultiplexers 308A and 308B allow the system 300 to accommodate additional optical signals of different wavelengths or colors.

The optical sources 302A and 302B produce source optical signals. The source optical signals may have different wavelengths. The modulator 304A modulates the source optical signal from the optical source 302A. The modulator 304B modulates the source optical signal from the optical source 302B. Generally, the modulators 304A and 304B modulate the source optical signals to encode the optical signals with information or data. The modulators 304A and 304B output the modulated optical signals to the optical circuits 108A and 108B, respectively. In this manner, the optical sources 302A and 302B and the modulators 304A and 304B effectively serve as transmitters that transmit optical signals to the optical circuits 108A and 108B. The controller 110 adjusts the optical circuits 108A and 108B so that the optical circuits 108A and 108B output the polarization states of the modulated optical signals to the multiplexers/demultiplexers 308A and 308B. The controller 110 may control the multiplexers/demultiplexers 308A and 308B to output the polarization states to the PSR 106. The PSR 106 may combine the polarization states to produce the modulated optical signal.

The multiplexers/demultiplexers 308A and 308B may be wavelength division multiplexers/demultiplexers. The controller 110 may control the multiplexers/demultiplexers 308A and 308B to select or produce optical signals of a particular wavelength. For example, the controller 110 may control the multiplexers/demultiplexers 308A and 308B to select the polarization states of the modulated optical signal from the optical circuit 108A or the optical circuit 108B. As another example, the controller 110 may control the multiplexers/demultiplexers 308A and 308B to output the polarization states of an optical signal from the PSR 106 to the optical circuit 108A or the optical circuit 108B.

As a result, when the optical circuit 108A is transmitting polarization states of a modulated optical signal to the multiplexers/demultiplexers 308A and 308B, the controller 110 may control the multiplexers/demultiplexers 308A and 308B to select the inputs receiving the polarization states and to output the polarization states to the PSR 106. When the optical circuit 108B is transmitting polarization states of a modulated optical signal to the multiplexers/demultiplexers 308A and 308B, the controller 110 may control the multiplexers/demultiplexers 308A and 308B to select the inputs receiving the polarization states and to output the polarization states to the PSR 106. The PSR 106 may then combine the polarization states (e.g., after rotating one of the polarization states) to produce and output the modulated optical signal.

The PSR 106 may receive an optical signal and separate the polarization states of the optical signal. The PSR 106 may also rotate one of the polarization states. The PSR 106 may output the resulting polarization states to the multiplexers/demultiplexers 308A and 308B. The multiplexers/demultiplexers 308A and 308B may output the polarization states to the optical circuit 108A or the optical circuit 108B, depending on the control signal from the controller 110. The controller 110 may then adjust the optical circuit 108A or the optical circuit 108B to produce and output the optical signal received by the PSR 106 to the corresponding receiver 306A or 306B. In this manner, the system 300 allows for bidirectional communication while accommodating additional optical signals of different wavelengths.

For example, when the PSR 106 receives an optical signal intended for the receiver 306A, the PSR 106 may separate the polarization states of the optical signal and rotate one of the polarization states. The PSR 106 then outputs the resulting polarization states to the multiplexers/demultiplexers 308A and 308B. The controller 110 may control the multiplexers/demultiplexers 308A and 308B so that the multiplexers/demultiplexers 308A and 308B output the polarization states to the optical circuit 108A. The controller 110 also controls the optical circuit 108A so that the optical circuit 108A directs the received signals to the receiver 306A, which causes the optical circuit 108A to output the optical signal received by the PSR 106 to the receiver 306A.

As seen in FIG. 3, the controller 110 may receive input from the receivers 306A and 306B. For example, the receivers 306A and 306B, the optical circuits 108A and 108B, or the controller 110 may include photodetectors that convert the optical signals at the receiver 306A and 306B into electric signals. The controller 110 may then analyze these electric signals to determine how to control the optical circuits 108A and 108B and the multiplexers 308A and 308B.

It is understood that the system 300 may accommodate any suitable number of optical sources 302 and handle optical signals of any suitable number of different wavelengths. For example, the system 300 may include additional optical sources 302, modulators 304, receivers 306, optical circuits 108, multiplexers/demultiplexers 308, and PSRs 106 to handle the additional optical signals. Additionally, the system 300 may include reciprocal circuits a (e.g., reciprocal PSR 106, reciprocal multiplexers/demultiplexers 308, reciprocal optical circuits 108, reciprocal modulators 304, reciprocal receivers 306, reciprocal optical sources 302, and a reciprocal controller 110) that transmit modulated optical signals to the PSR 106 and that receive modulated optical signals from the PSR 106 (similar to the reciprocal circuit shown in the system 200 of FIG. 2).

Figure 4:
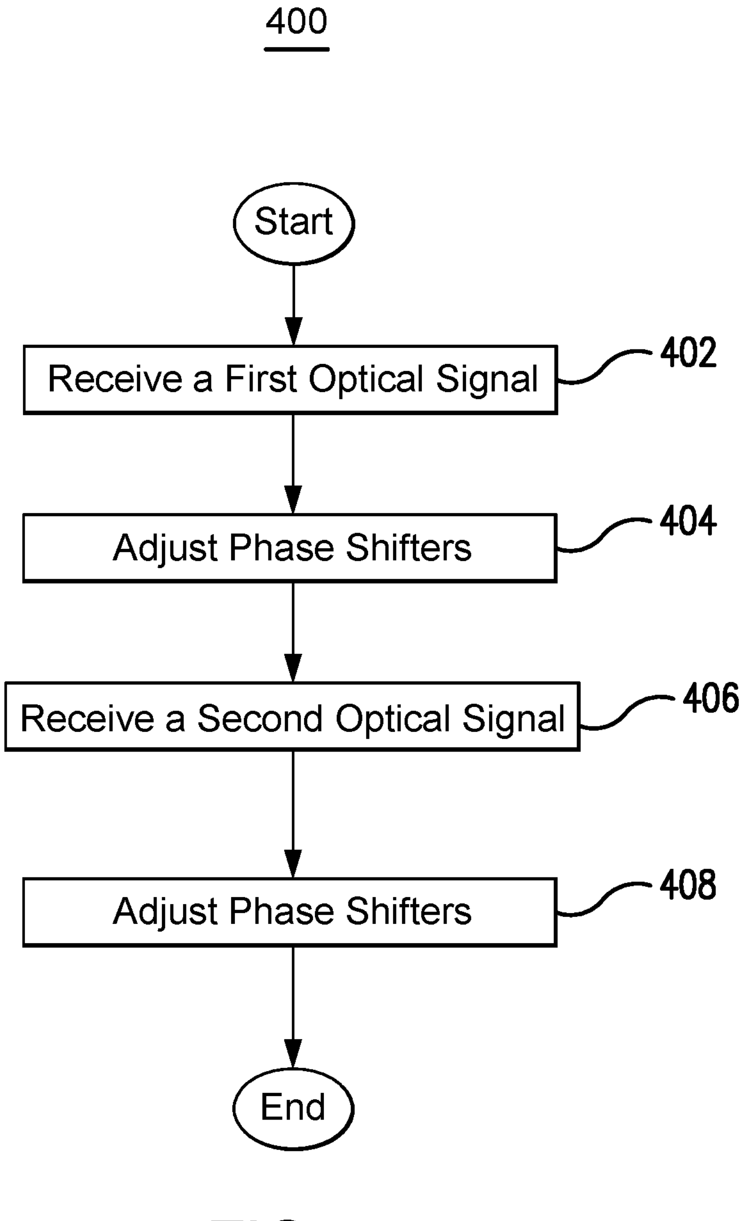
FIG. 4 is a flowchart of an example method performed in the system of FIG. 1.

FIG. 4 is a flowchart of an example method 400 performed in the system 100 of FIG. 1. In particular embodiments, components of the optical circulator 102 perform the steps of the method 400. By performing the method 400, the optical circulator 102 provides bidirectional communication while being integrated in a silicon photonics chip.

In block 402, the optical circulator 102 receives a first optical signal 132. The PSR 106 of the optical circulator 102 may receive the optical signal 132 at a port 122 of the PSR 106 over the fiber 104. The PSR 106 may separate polarization states of the optical signal 132 and rotate one of the polarization states. For example, the PSR 106 may separate the transverse electric and the transverse magnetic components of the optical signal 132. The PSR 106 may then rotate the transverse magnetic component by 90 degrees. The PSR 106 may then output these polarization states to the optical circuit 108 in the circulator 102.

In block 404, the controller 110 of the optical circulator 102 adjusts the phase shifters 112, 116, and 120 of the optical circuit 108. The controller 110 may adjust the phase shifters 112, 116, and 120 in response to signals detected by the controller 110 at the port 130 of the optical circuit 108. For example, the controller 110 may use an optical tap or a photodiode at the port 130 to detect optical signals at the port 130. The controller 110 may adjust the phase shifters 112, 116, and 120 such that the optical circuit 108 outputs the optical signal 132 at the port 128 of the optical circuit 108. For example, the controller 110 may use the optical tap or the photodiode to see if any of the optical signal 132 is present at the port 130. The controller 110 may then adjust the phase shifters 112, 116, and 120 to reduce the presence of the optical signal 132 at the port 130, which directs the optical signal 132 to the port 128.

In block 406, the optical circulator 102 receives a second optical signal 134. The optical circuit 108 may receive the optical signal 134 at a port 130 of the optical circuit 108.

In block 408, the controller 110 may adjust the phase shifters 112, 116, and 120 to direct the optical signal 134 received at the port 130 to the PSR 106. For example, the controller 110 may adjust the phase shifters 112, 116, and 120 so that the optical circuit 108 outputs a first polarization state and a second rotated polarization state of the optical signal 134 to the PSR 106. The PSR 106 may then rotate the second polarization state and combine the polarization states to produce the optical signal 134. The PSR 106 then outputs the optical signal 134 at the port 122 and over the fiber 104. In this manner the circulator 102 provides for bidirectional communication over the fiber 104 while being integrated in a silicon photonic shift, in certain embodiments.

In summary, a polarization tracker circuit is used as an optical circulator 102. Generally, the polarization tracker includes a polarization splitter (e.g., a PSR 106), an optical circuit 108 optically coupled to the PSR 106, and a controller 110. The PSR 106 receives a first optical signal 132 at a first port 122 of the PSR 106. The controller 110 may adjust phase shifters 112, 116, and 120 in the optical circuit 108 such that the optical circuit 108 outputs the first optical signal 132 at a first port 128 of the optical circuit 108. The optical circuit 108 may also receive a second optical signal 134 at a second port 130 of the optical circuit 108. The controller 110 may adjust the phase shifters 112, 116, and 120 to cause the PSR 106 to output the second optical signal 134 at the first port 122 of the PSR 106, where the first optical signal 132 was received by the PSR 106. The polarization tracker circuit may be more easily integrated into silicon photonics than existing circulators. Thus, the polarization tracker circuit may allow a bidirectional optical circuit to be implemented in silicon photonics.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," or "at least one of A or B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A system comprising:

a first polarization splitter arranged to receive, at a first port of the first polarization splitter, a first optical signal;

a first optical circuit optically coupled to the first polarization splitter, the first optical circuit comprising a first plurality of phase shifters, wherein the first optical circuit is arranged to receive, at a first port of the first optical circuit, a second optical signal; and a first controller configured to adjust the first plurality of phase shifters such that (i) the first optical circuit outputs the first optical signal at a second port of the first optical circuit, (ii) the first plurality of phase shifters separate the second optical signal into a first component and a second component, (iii) the first plurality of phase shifters direct the first component to a second port of the first polarization splitter and the second component to a third port of the first polarization splitter, and (iii) the first polarization splitter produces the second optical signal using the first and second components and outputs the second optical signal at the first port of the first polarization splitter.

2. The system of claim 1, wherein:

the first polarization splitter is arranged to produce, based on the first optical signal, a third optical signal at the second port of the first polarization splitter;

the first polarization splitter is arranged to produce, based on the first optical signal, a fourth optical signal at the third port of the first polarization splitter;

the first optical circuit is optically coupled to the second port of the first polarization splitter and to the third port of the first polarization splitter; and the first plurality of phase shifters and a first plurality of optical couplers of the first optical circuit produce the first optical signal at the second port of the first optical circuit based on the third optical signal and the fourth optical signal.

3. The system of claim 1, wherein an optical coupler of the first optical circuit is positioned between a first set of phase shifters of the first plurality of phase shifters and a second set of phase shifters of the first plurality of phase shifters.

4. The system of claim 1, further comprising an optical fiber optically connected to the first port of the first polarization splitter, wherein the optical fiber carries (i) the first optical signal to the first polarization splitter and (ii) the second optical signal away from the first polarization splitter.

5. The system of claim 1, further comprising:

an optical receiver arranged to receive the first optical signal at the second port of the first optical circuit; and an optical transmitter arranged to transmit the second optical signal to the first port of the first optical circuit.

6. The system of claim 1, wherein the first polarization splitter and the first optical circuit are arranged in a silicon photonic chip.

7. The system of claim 1, further comprising:

a second polarization splitter arranged to receive the second optical signal from the first polarization splitter;

a second optical circuit comprising a second plurality of phase shifters; and a second controller configured to adjust the second plurality of phase shifters such that the second optical circuit outputs the second optical signal at a port of the second optical circuit.

8. The system of claim 1, wherein the first polarization splitter is a polarization splitter rotator or a polarization splitter grating coupler.

9. A method comprising:

receiving, at a first port of a first polarization splitter, a first optical signal;

receiving, at a first port of a first optical circuit optically coupled to the first polarization splitter, a second optical signal, wherein the first optical circuit comprises a first plurality of phase shifters; and adjusting by a first controller, the first plurality of phase shifters such that (i) the first optical circuit outputs the first optical signal at a second port of the first optical circuit, (ii) the first plurality of phase shifters separate the second optical signal into a first component and a second component, (iii) the first plurality of phase shifters direct the first component to a second port of the first polarization splitter and the second component to a third port of the first polarization splitter, and (iii) the first polarization splitter produces the second optical signal using the first and second components and outputs the second optical signal at the first port of the first polarization splitter.

10. The method of claim 9, further comprising:

producing, by the first polarization splitter and based on the first optical signal, a third optical signal at the second port of the first polarization splitter; and producing, by the first polarization splitter and based on the first optical signal, a fourth optical signal at the third port of the first polarization splitter, wherein the first optical circuit is optically coupled to the second port of the first polarization splitter and to the third port of the first polarization splitter, and wherein the first plurality of phase shifters and a first plurality of optical couplers of the first optical circuit produce the first optical signal at the second port of the first optical circuit based on the third optical signal and the fourth optical signal.

11. The method of claim 9, wherein an optical coupler of the first optical circuit is positioned between a first set of phase shifters of the first plurality of phase shifters and a second set of phase shifters of the first plurality of phase shifters.

12. The method of claim 9, further comprising carrying, by an optical fiber optically connected to the first port of the first polarization splitter, (i) the first optical signal to the first polarization splitter and (ii) the second optical signal away from the first polarization splitter.

13. The method of claim 9, further comprising:

receiving, by an optical receiver, the first optical signal at the second port of the first optical circuit; and transmitting, by an optical transmitter, the second optical signal to the first port of the first optical circuit.

14. The method of claim 9, wherein the first polarization splitter and the first optical circuit are arranged in a silicon photonic chip.

15. The method of claim 9, further comprising:

receiving, by a second polarization splitter, the second optical signal from the first polarization splitter; and adjusting, by a second controller, a second plurality of phase shifters of a second optical circuit such that the second optical circuit outputs the second optical signal at a port of the second optical circuit.

16. The method of claim 9, wherein the first polarization splitter is a polarization splitter rotator or a polarization splitter grating coupler.

17. A photonic chip comprising:

a polarization splitter arranged to receive a first optical signal at a first port of the polarization splitter;

a first multiplexer arranged to receive a first output from the polarization splitter;

a second multiplexer arranged to receive a second output from the polarization splitter; and a first optical circuit optically coupled to the first multiplexer and the second multiplexer and arranged to receive a second optical signal at a first port of the first optical circuit, the first optical circuit comprising a plurality of phase shifters arranged such that (i) the first optical circuit outputs, at a second port of the first optical circuit, the first optical signal, (ii) the plurality of phase shifters separate the second optical signal into a first component and a second component, (iii) the first multiplexer directs the first component to a second port of the polarization splitter and the second multiplexer directs the second component to a third port of the polarization splitter, and (iii) the polarization splitter produces the second optical signal using the first and second components and outputs, at the first port of the polarization splitter, the second optical signal.

18. The photonic chip of claim 17, wherein the first optical circuit is arranged to produce the first optical signal based at least in part on the first output from the polarization splitter and the second output from the polarization splitter.

19. The photonic chip of claim 17, further comprising a second optical circuit optically coupled to the first multiplexer and the second multiplexer, the second optical circuit comprising a plurality of phase shifters.

20. The photonic chip of claim 17, further comprising an optical fiber optically connected to the first port of the polarization splitter, wherein the optical fiber carries (i) the first optical signal to the polarization splitter and (ii) the second optical signal away from the polarization splitter.

* * * * *